Patented Jan. 27, 1925.

1,524,134

UNITED STATES PATENT OFFICE.

OTIS HUTCHINS, OF NIAGARA FALLS, NEW YORK, ASSIGNOR TO THE CARBORUNDUM COMPANY, OF NIAGARA FALLS, NEW YORK, A CORPORATION OF PENNSYLVANIA.

ALUMINOUS ABRASIVE MATERIAL AND METHOD OF MAKING THE SAME.

No Drawing.   Application filed July 3, 1922. Serial No. 572,727.

*To all whom it may concern:*

Be it known that I, OTIS HUTCHINS, a citizen of the United States, residing at Niagara Falls, in the county of Niagara and State of New York, have invented a new and useful Improvement in Aluminous Abrasive Materials and Methods of Making the Same, of which the following is a full, clear, and exact description.

My invention relates to a new type of artificial aluminous abrasive material especially adapted for certain purposes, and to a method of making the same.

Heretofore such artificial aluminous abrasives have usually consisted of 94 per cent or upwards of alumina combined with other impurities such as titanium oxide, iron oxide, silica, etc. In the manufacture of this type of abrasive, the material, such as bauxite or other aluminous material with carbon and iron or iron oxide, has been fused in an arc type electric furnace. During this operation the normal impurities of bauxite, consisting usually of iron oxide, silica and titanium oxide, are largely reduced to a metallic state during the fusion, thus giving a metallic alloy of higher specific gravity than the molten alumina, which alloy settles to the bottom of the furnace. The fusion has been carried out until reduction of the impurities has practically ceased and evolution of gases has stopped, when the molten product is tapped from the furnace into a dry container and allowed to cool.

In some cases the molten alumina has been tapped out into solid thin layers in such a manner as to produce a more rapid chilling to give an abrasive of very fine crystalline structure and of great density and toughness, and without any honeycombing of the structure.

The crude aluminous abrasive manufactured as above described consists of a solid, dense mass of alumina crystals of varying sizes which when crushed or broken give solid sharp grains of varying sizes, which are graded. For abrasive purposes it has been essential that each grain should consist of a solid, dense mass of abrasive material as sharp and tough as possible; and the demand is usually for grains of this character which will pass through a screen of ten meshes to the linear inch and will not pass through a screen of 150 meshes per linear inch.

To meet these demands, abrasive manufacturers have used every effort to produce such abrasives free from porosity and of great density by reaching a dead melt after the gases of reduction have passed off and reduction of impurities has practically ceased.

I have discovered that if such melted aluminous abrasive is tapped out and quenched so that gas or vapor is evolved in the mass, a porous honeycomb product is obtained which has special value in certain lines of industrial uses.

In carrying out my process in its preferred form, I melt in the ordinary manner in an electric furnace of the arc type provided with a tap hole, a mixture of aluminous material with sufficient carbon to cause the desired purification. When the furnace is nearly full of such melted material, I add a fresh charge of the mixture, and before the reduction of the impurities in the added charge has been completed, and while gases of reduction are being evolved, I tap the molten mass from the furnace. As the melted material issues from the furnace I quench it, preferably by a stream of water or by tapping it into water. This causes solidification accompanied by evolution of steam and escape of gas contained in the melt, with resulting high porosity. The material contains 92 per cent or upwards of alumina, the alumina crystals being relatively small in size—as a rule not over .005 inch in diameter.

The principal novel feature of this new abrasive is its extreme porosity, which in the average run is more than 35 per cent. The pore cells are approximately spherical or spheroidal and vary in size from one-fourth of an inch or more down to less than one-hundredth of an inch. These cells in general do not communicate with each other, but are separated by thin walls or partitions, the cell walls varying in thickness from an average of one-eighth of an inch down to one-tenth of an inch, or even finer. These pores are not like those in a ceramic clay article, where they are connected to form continuous passages, but are separated from each other. The color of the product varies from a light gray or pink gray to a dark gray or black. This new material, while inferior to such prior material as an abrasive in its coarse and intermediate stages, can be used to very good advantage in the finer sizes. It is of especial advantage when fragments of this porous abrasive material are mixed with cement or proper matrix in the construction of non-slip floors or floor tiles or treads.

In carrying out the process with a high alumina material, I may fuse it without the use of a reducing agent. I may employ as a source of alumina any of the well known materials, such as bauxite, emery, clay, or suitable waste material from abrasive manufacture. As a reducing agent I may use carbon in any of its forms, such as coal or charcoal.

I may add to the charge mixture iron or iron oxide to produce the proper grade of ferro-silicon alloy, and I may also add small quantities of metallic oxides, such, for example, as chromium, to give the abrasive distinctive coloring.

Changes may be made in the method of quenching, in the mix employed, etc., without departing from my invention.

I claim:

1. As a new article of manufacture, a mass of fused alumina crystals about .005 in diameter having a highly porous honeycomb structure.

2. As a new article of manufacture, fused aluminous material having more than 25 per cent enclosed pores.

3. As a new article of manufacture, fused aluminous material having an average of about 35 per cent pores.

4. In the manufacture of artificial aluminous material, the steps of fusing aluminous material and tapping the same before reduction and quenching to form a porous material.

5. In the manufacture of artificial aluminous material, the steps of fusing aluminous material and tapping the same while gases are being evolved to a material extent in the material and quenching.

6. In the manufacture of artificial aluminous material, the steps of fusing aluminous material, tapping the same while gases are being evolved to a material extent in the material, and quenching the same by a fluid.

7. In the manufacture of artificial aluminous material, the steps of tapping the fused material while reduction of the impurities is proceeding, and quenching the tapped product by a liquid.

8. In the manufacture of artificial aluminous materal, the steps of fusing aluminous material in an electric furnace, adding material which will evolve gases, and tapping the fused material while gases are being evolved and quenching.

9. In the manufacture of artificial aluminous material, the steps of fusing aluminous material in an electric furnace, adding material which will evolve gases, tapping the fused material while gases are being evolved and before reduction and quenching the material.

10. In the manufacture of artificial aluminous material, the step of tapping fused aluminous material from a furnace, and quenching the same in the presence of gases to form a porous mass.

11. In the manufacture of aluminous materials, the step of fusing aluminous materials in an electric furnace with sufficient carbon to cause the desired purification, adding a fresh charge of such material to the fused mass, tapping the mass before the reduction of the impurities in the added charge and quenching the stream of fused material as it flows from the furnace.

In testimony whereof I have hereunto set my hand.

OTIS HUTCHINS.